(12) United States Patent
Malik et al.

(10) Patent No.: US 10,049,591 B2
(45) Date of Patent: Aug. 14, 2018

(54) CLASSROOM MANAGEMENT APPLICATION AND SYSTEM

(71) Applicant: NorthCanal Group, LLC, Arlington, VA (US)

(72) Inventors: Aman Malik, Arlington, VA (US); Christopher L. Phillips, Arlington, VA (US)

(73) Assignee: NORTHCANAL GROUP LLC, Arlington, VA (US)

( * ) Notice: Subject to any disclaimer, the term of this patent is extended or adjusted under 35 U.S.C. 154(b) by 444 days.

(21) Appl. No.: 14/215,951

(22) Filed: Mar. 17, 2014

(65) Prior Publication Data

US 2014/0272896 A1 Sep. 18, 2014

Related U.S. Application Data

(60) Provisional application No. 61/787,968, filed on Mar. 15, 2013.

(51) Int. Cl.
| | | |
|---|---|---|
| *G06F 17/00* | (2006.01) | |
| *G09B 5/12* | (2006.01) | |
| *G06Q 10/10* | (2012.01) | |
| *G09B 7/02* | (2006.01) | |

(52) U.S. Cl.
CPC ........... *G09B 5/125* (2013.01); *G06Q 10/103* (2013.01); *G09B 7/02* (2013.01)

(58) Field of Classification Search
CPC . G09B 7/02; G09B 7/00; G09B 5/125; G09B 7/08; G06Q 50/20
See application file for complete search history.

(56) References Cited

U.S. PATENT DOCUMENTS

| | | | | |
|---|---|---|---|---|
| 2011/0065082 A1* | 3/2011 | Gal | .......................... | G09B 7/02 434/365 |
| 2011/0250580 A1* | 10/2011 | Sandeep | .................. | G09B 7/02 434/362 |
| 2012/0123758 A1* | 5/2012 | Kevan | .................... | G09B 19/00 703/6 |
| 2012/0164619 A1* | 6/2012 | Meer | ........................ | G09B 7/02 434/350 |
| 2013/0004929 A1* | 1/2013 | Otwell | ..................... | G09B 5/00 434/350 |
| 2013/0004932 A1* | 1/2013 | Mahajan | .................. | G09B 7/02 434/362 |
| 2013/0091240 A1* | 4/2013 | Auger | ................... | G06F 17/241 709/217 |

(Continued)

OTHER PUBLICATIONS nClass website, May 28, 2013.*

*Primary Examiner* — Nathan Hillery
(74) *Attorney, Agent, or Firm* — W&C IP

(57) ABSTRACT

A classroom management system which includes a centralized cloud infrastructure, a first user interface having a geo-locating device in communication with the centralized cloud infrastructure, and a second user communication interface in communication with the centralized cloud infrastructure to define authorized users and authorized locations. The centralized cloud infrastructure transmits an in-attendance signal for each authorized user located in the authorized location based on data received from the geo-locating device to the second user communication interface.

16 Claims, 3 Drawing Sheets

(56) References Cited

U.S. PATENT DOCUMENTS

| | | | | |
|---|---|---|---|---|
| 2013/0280689 A1* | 10/2013 | Meer | ............ | G09B 7/02 |
| | | | | 434/350 |
| 2013/0325665 A1* | 12/2013 | Shaffer | ............ | G09B 7/02 |
| | | | | 705/26.61 |
| 2014/0227673 A1* | 8/2014 | Yousef | ............ | G09B 5/00 |
| | | | | 434/350 |
| 2014/0255889 A1* | 9/2014 | Grimes | ............ | G09B 19/00 |
| | | | | 434/236 |
| 2015/0365909 A1* | 12/2015 | Cacioppo | ............ | G09B 7/02 |
| | | | | 370/329 |

* cited by examiner

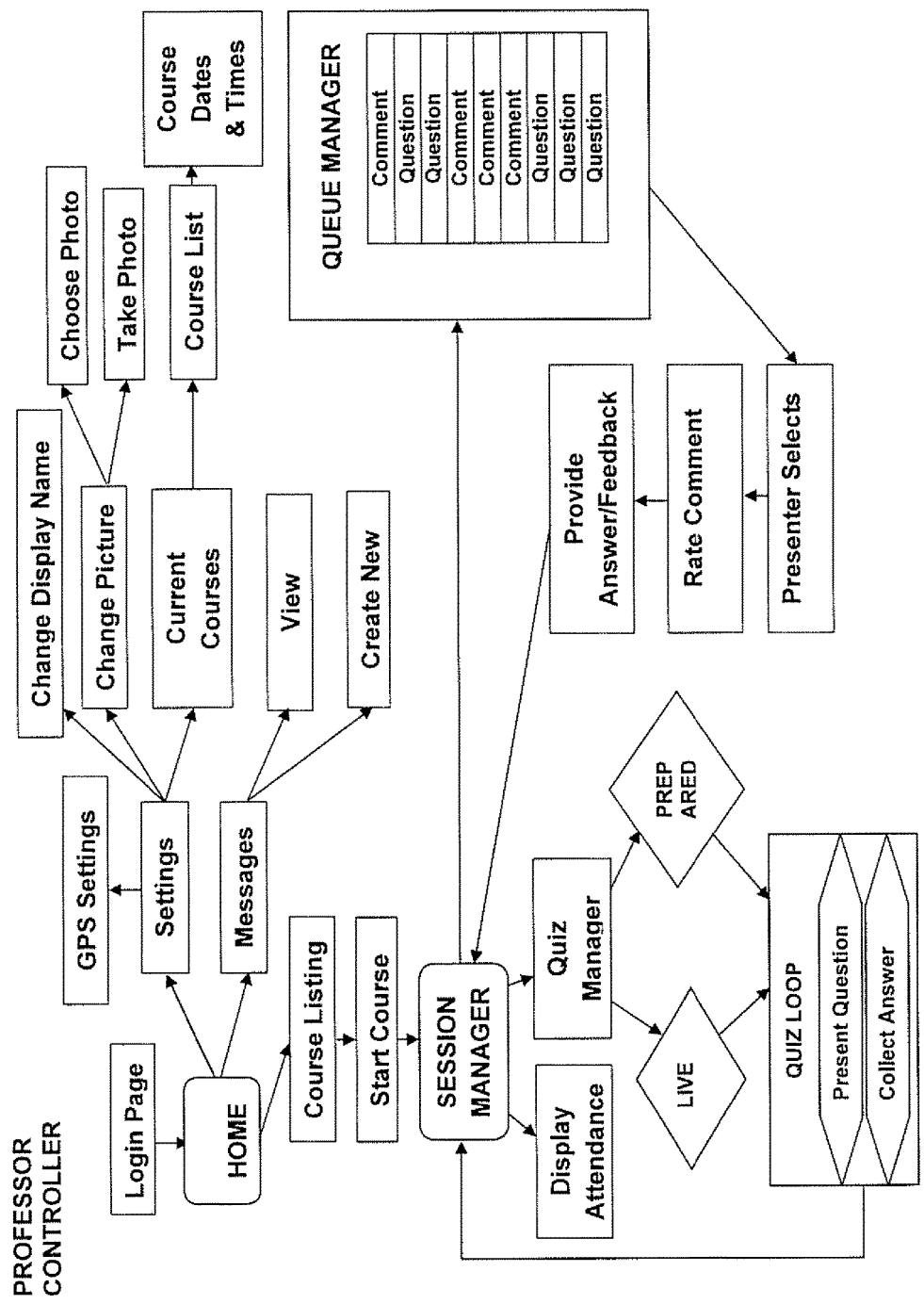
FIG. 2 Professor Controller Functional Outline

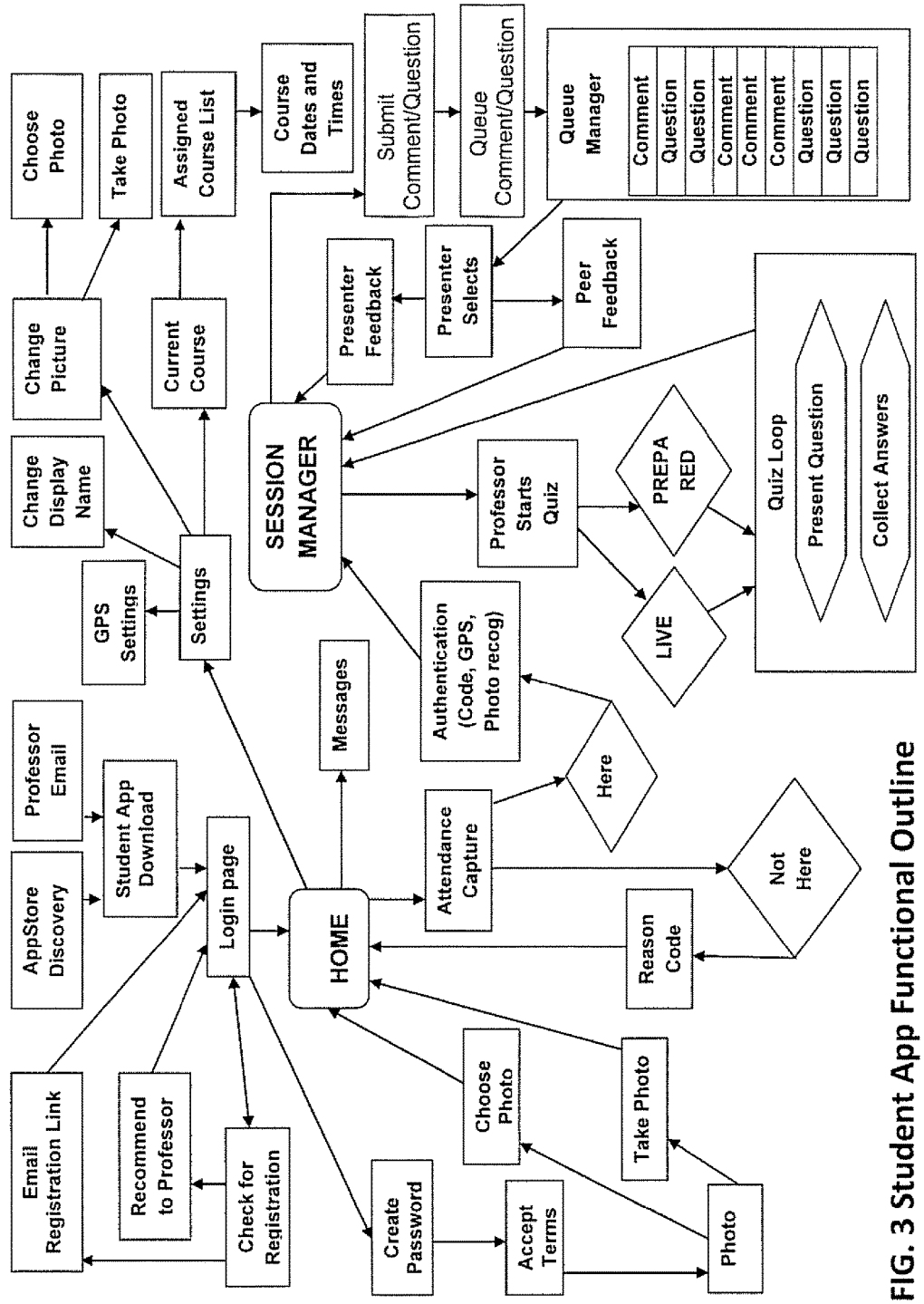
FIG. 3 Student App Functional Outline

CLASSROOM MANAGEMENT APPLICATION AND SYSTEM

CROSS-REFERENCE TO RELATED APPLICATIONS

This application claims the priority of U.S. Provisional Patent Application No. 61/787,968 filed Mar. 15, 2013, the complete contents of which are herein incorporated by reference.

DESCRIPTION

Field of the Invention

The present general inventive concept relates to a classroom management system, and more particularly to an electronic classroom management system which facilitates in-classroom learning by allowing class participation and idea sharing through the use of the internet and mobile devices or various other user interface devices.

SUMMARY

The present general inventive concept relates to a classroom management system, and more particularly to an electronic classroom management system which facilitates in-classroom learning by allowing class participation and idea sharing through the use of the internet and mobile devices or various other user interface devices. The user interfaces may include mobile devices, cellular phones, laptops, tablets or various other communications devices. However, the present general inventive concept is not limited thereto.

The present general inventive concept provides a centralized user interface which allows an instructor or presenter to electronically determine student attendance at a particular class, presentation, or event. In exemplary embodiments, the classroom management system obtains the student's location/geo-location during a specified time, such as during a specified time for student attendance, from the student's user interface device. That is, the student's geo-location information may be used to verify the student's attendance at a particular class during a specified time period.

The present general inventive concept also allows students to submit questions or comments which are queued and accessible to the instructor or presenter, in real-time. The submitted questions and/or comments may be displayed on user interfaces accessible by the students and/or instructors, in real time.

The present general inventive concept further allows instructors and students to socialize/communicate in real time. The students can rate their peer's comments or questions in real-time. In addition, the instructors can broadcast messages to desired recipients including students in real time.

The present general inventive concept also allows users the ability to electronically capture and evaluate data regarding student attendance and student participation in classroom discussions, using existing infrastructure and existing mobile devices running a custom software or application.

The present general inventive concept also utilizes a centralized management server (e.g., the centralized user interface) in communication with each student user interface device to distribute tests, quizzes, and/or surveys to all of the enrolled students. The tests, quizzes, and/or surveys may be created by the instructor in real-time or previously and sent to the enrolled students via the centralized management server and is accessible by each student. The student may then complete the tests, quizzes, and/or surveys using the student user interface device and submit their responses to the centralized management server. The centralized management server may grade each test and quiz, in real-time, providing the instructor with real-time evaluation of the students. In addition, the instructor may survey the entire class to judge material comprehension and/or interest level and the students may respond anonymously, thereby providing the instructor with a true indication of students comprehension.

The present general inventive concept also utilizes a centralized management server (e.g., the centralized user interface) in communication with each student user interface device to record each students voice, using the first user interface device's microphone and compare it to actual in class discussions to thereby determine each students class participation. Class participation is difficult for an instructor to quantify and grade, however the present general inventive concept will provide a summary as to the time each student speak and/or contributes to in-classroom discussions. These student voice recordings may be evaluated for content, converted to text and/or catalog on student accessible website or blog.

In particular, the classroom management system according to the present general inventive concept includes a centralized cloud infrastructure, a first user interface having a geo-locating device in communication with the centralized cloud infrastructure, and a second user communication interface having an input device and a display device in communication with the centralized cloud infrastructure. The second user communication interface may be used to define authorized users and corresponding authorized locations, wherein the centralized cloud infrastructure transmits an in-attendance signal for each authorized user located in the authorized location based on data received from the geo-locating device of the first user interface to the second user communication interface.

The present general inventive concept also provides an electronic classroom management system which facilitates in-classroom and/or remote learning by allowing class participation and idea sharing through the use of the internet and mobile devices or various other user interface devices. For instance, the electronic classroom management system may be used in Virtual Education, distance learning, remote learning, and/or remote teaching environments wherein students may be located remotely and may communicate in a centralized forum via the internet. The communication may include audio and/or video conferencing through the internet or through traditional phone lines. However the present general inventive concept is not limited thereto.

The present general inventive concept provides a centralized user interface which allows an instructor or presenter to electronically determine student or participant attendance at a particular class or presentation. In particular, the classroom management system utilizes the geo-location capabilities of a student's mobile device in order to capture the student's location at a specified time to determine whether the student is present in a specified location. The specified time may be within the first five minutes of a particular class or presentation and the specified location may include the class room, the school auditorium, or other location. The classroom management system may further be integrated with digital security systems in order to verify that only authorized users are located in authorized locations. However, the present general inventive concept is not limited thereto.

BRIEF DESCRIPTION OF THE DRAWINGS

The general inventive concept is further described in the detailed description that follows, by reference to the noted drawings by way of non-limiting illustrative exemplary embodiments of the general inventive concept, in which like reference numerals represent similar parts throughout the drawings. As should be understood, however, the general inventive concept is not limited to the precise arrangements and instrumentalities illustrated.

An exemplary embodiment of the present general inventive concept, which in no way limits the claims will now be more particularly described by way of example with reference to the accompanying drawings, wherein:

FIG. 2 is a functional schematic diagram of the classroom management system when accessed by a professor according to an exemplary embodiment of the present general inventive concept; and FIG. 3 is a functional schematic diagram of the classroom management system when accessed by a student according to an exemplary embodiment of the present general inventive concept.

DETAILED DESCRIPTION

Figure 1:
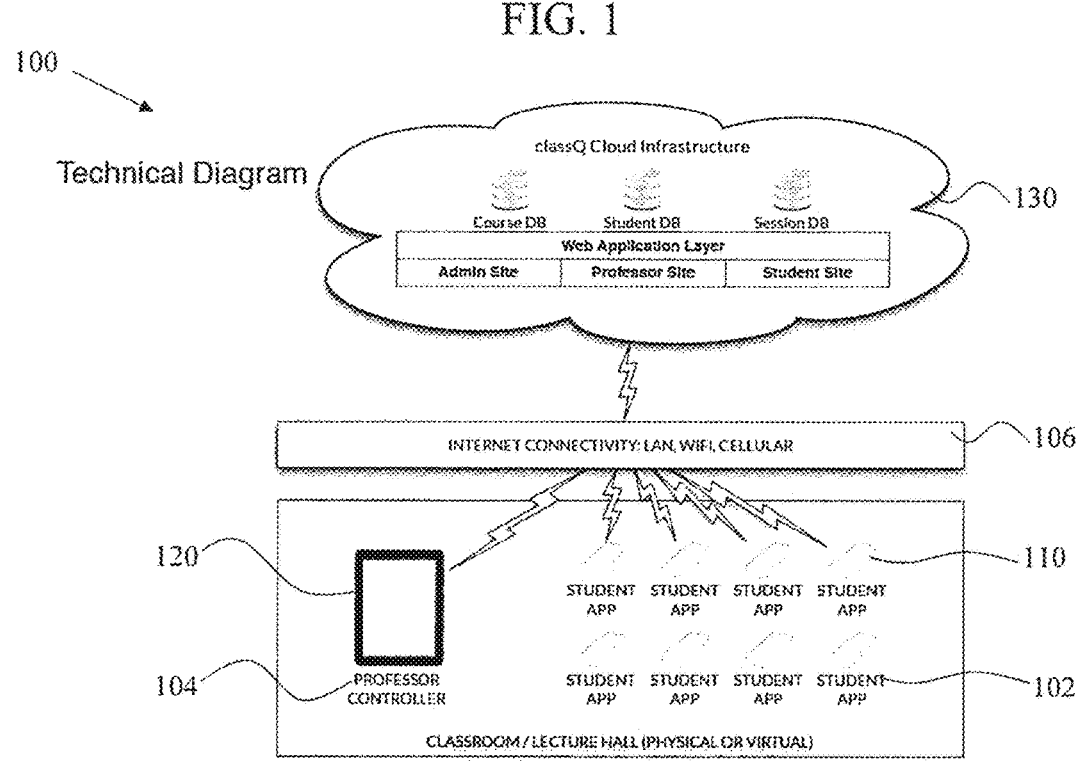
FIG. 1 is a schematic diagram of the classroom management system according to an exemplary embodiment of the present general inventive concept.

The present general inventive concept relates to a classroom management system, and more particularly to an electronic classroom management system which facilitates in-classroom learning and idea sharing through the use of the Internet and mobile devices.

FIG. 1 is a schematic diagram of the classroom management system 100 according to an exemplary embodiment of the present general inventive concept. The classroom management system 100 includes a first-user accessible electronic communication device 110 and a second-user accessible electronic device 120 in communication with a cloud server infrastructure 130. However, the present general inventive concept is not limited thereto. That is, in alternative exemplary embodiments a plurality of students (i.e., first users 102) may each use a plurality of electronic communication devices to communicate and/or interact with the classroom management system 100. Similarly, a plurality of instructors (i.e., second users 104) may use a plurality of electronic communication devices to communicate and/or interact with the classroom management system 100.

For instance, the first user 102 may include a student or presentation participant, and the second user 104 may include instructors, professors, and administrative staff. The electronic communication devices 110, 120 may include cell phones, tablets, PDA, computers, laptops, or the like. However, the present general inventive concept is not limited thereto.

The communication between the first and second electronic devices 110, 120 with the cloud server infrastructure 130 may be through a LAN, Wifi, or cellular type connection 106. However, the present general inventive concept is not limited thereto.

FIG. 2 is a functional schematic diagram of the classroom management system 100 when accessed by a professor 104 according to an exemplary embodiment of the present general inventive concept. FIG. 3 is a functional schematic diagram of the classroom management system 100 when accessed by a student 102 according to an exemplary embodiment of the present general inventive concept.

Referring to FIG. 2, the second user 104 may login 200 into the cloud server infrastructure 130 using his/her electronic communication device 120 to download software necessary to operate and/or communicate with the classroom management system 100; to define his/her course description and schedule; to upload course materials; to enroll students for each course; to manage student attendance; and manage/monitor the classroom management system 100. However, the present general inventive concept is not limited thereto.

Referring to FIG. 3, the first user 102 may login 300 into the cloud server infrastructure 130 using his/her electronic communication device 110 to download software necessary to operate and/or communicate with the classroom management system 100.

In an exemplary embodiment, the classroom management system 100 provides a centralized user interface which allows the second user 104 (i.e., instructor or presenter) to electronically determine whether or not the first user 102 (i.e., student or participant) is in attendance at a particular class or presentation. In particular, the first user's 102 communication device 110 may include a geo-location device 109 which communicates with the cloud server infrastructure 130 when within a predetermined range of the class or presentation. The cloud server infrastructure 130 may further verify whether the first user 102 is authorized to participate in the class or presentation by comparing identification information received from the first user's 102 communication device 110 to a list of enrolled students submitted by the second user 104.

In alternative exemplary embodiments, the classroom management system 100 may use the geo-location data from each authorized student's mobile device combined with facial recognition data received from within the classroom or school to identify and/or locate an unauthorized student or person. That is, the identification and/or location of each person within a desired location, such as a classroom, may be compared to a list of authorized individuals including enrolled students, staff, and professors to identify and locate unauthorized individuals. The classroom management system 100 may further sound an alarm or display a warning if an unauthorized individual is located with a defined location or if a student is not authorized for a particular location during a specified times.

In exemplary embodiments, the classroom management system 100 allows the first user 102 to submit questions and/or comments which are queued and accessible to the second user 104, in real-time. The first user 102 may submit a question by text or speech by using his/her communication device 110 to the cloud server infrastructure 130 which may then be queued and displayed on the second user's 104 communication device 120.

In exemplary embodiments, the classroom management system 100 further allows the first and second users 102, 104 to communicate to each other, using real-time messaging.

The centralized cloud infrastructure may include a network and the hardware, software, and firmware required for supporting communication networks. This may include but is not limited to one or more servers, one or more non-volatile storage media, one or more databases, and one or more processors. Electronic devices such as user-interface devices may also comprise one or more processors configured to process and execute computer-implemented instructions which, upon processing or execution by the one or more processors, provides functionalities and capabilities according to classroom management systems as taught herein. Additionally, electronic devices or hardware of a cloud infrastructure may include one or more non-volatile storage media having stored thereon or which are configured to receive and to store computer-implemented instructions which, upon execution by one or more processors, cause said processors to provide functionalities and capabilities according to the teachings herein.

It is to be understood that the foregoing illustrative exemplary embodiments have been provided merely for the purpose of explanation and are in no way to be construed as limiting of the present general inventive concept. Words used herein are words of description and illustration, rather than words of limitation. In addition, the advantages and objectives described herein may not be realized by each and every exemplary embodiment practicing the present general inventive concept. Further, although the present general inventive concept has been described herein with reference to particular structure, steps and/or exemplary embodiments, the present general inventive concept is not intended to be limited to the particulars disclosed herein. Rather, the present general inventive concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the present general inventive concept.

What is claimed is:

1. A classroom management system, comprising:
   a centralized cloud infrastructure accessible over a network;
   one or more first user electronic devices selected from the group consisting of cell phones, tablets, personal data assistants, computers, and lap tops, wherein each of the one or more first user electronic devices include a geo-locating device, wherein each of the one or more first user electronic devices communicate location information and one or more of a question, answer, comment, rating, voice recording, and photo to the centralized cloud infrastructure over a network; and
   at least one second user electronic device different from said one or more first user electronic devices, said at least one second user electronic device selected from the group consisting of cell phones, tablets, personal data assistants, computers, and lap tops which communicate with said centralized cloud infrastructure over the network and which defines one or more authorized users and one or more authorized locations for said one or more authorized users,
   wherein said at least one second user electronic device obtains and verifies from the centralized cloud infrastructure an in-attendance signal only for each authorized user located in an authorized location based on data received from the geo-locating device of each of said one or more first user electronic devices, and
   wherein at least one of (i) said one or more first user electronic devices and (ii) said at least one second user electronic device receives from the centralized cloud over the network the one or more of a question, answer, comment, rating, voice recording, and photo,
   wherein the at least one second user electronic device is configured to initiate a voice recording using the centralized cloud infrastructure, and
   a microphone device of the one or more first user electronic devices records one or more spoken comments/questions of one or more authorized users.

2. The classroom management system of claim 1, wherein audio recorded with said microphone device is stored on said centralized cloud infrastructure and available via said at least one second user electronic device for later evaluation, transcription and/or publishing via a website or online blog.

3. A classroom management system, comprising:
   a centralized cloud infrastructure accessible over a network;
   one or more first user electronic devices selected from the group consisting of cell phones, tablets, personal data assistants, computers, and lap tops, wherein each of the one or more first user electronic devices include a geo-locating device, wherein each of the one or more first user electronic devices communicate location information and one or more of a question, answer, comment, rating, voice recording, and photo to the centralized cloud infrastructure over a network; and
   at least one second user electronic device different from said one or more first user electronic devices, said at least one second user electronic device selected from the group consisting of cell phones, tablets, personal data assistants, computers, and lap tops which communicate with said centralized cloud infrastructure over the network and which defines one or more authorized users and one or more authorized locations for said one or more authorized users,
   wherein said at least one second user electronic device obtains and verifies from the centralized cloud infrastructure an in-attendance signal only for each authorized user located in an authorized location based on data received from the geo-locating device of each of said one or more first user electronic devices, and
   wherein at least one of (i) said one or more first user electronic devices and (ii) said at least one second user electronic device receives from the centralized cloud over the network the one or more of a question, answer, comment, rating, voice recording, and photo,
   wherein the one or more first user electronic devices are configured such that said one or more authorized users selectively submit one or more questions or comments via the centralized cloud infrastructure,
   wherein said one or more questions or comments are displayed on both a first interface of said one or more first user electronic devices and a second interface of said at least one second user electronic device in real time based on data received from said centralized cloud infrastructure.

4. A classroom management system, comprising:
   a centralized cloud infrastructure accessible over a network;
   one or more first user electronic devices selected from the group consisting of cell phones, tablets, personal data assistants, computers, and lap tops, wherein each of the one or more first user electronic devices include a geo-locating device, wherein each of the one or more first user electronic devices communicate location information and one or more of a question, answer, comment, rating, voice recording, and photo to the centralized cloud infrastructure over a network; and
   at least one second user electronic device different from said one or more first user electronic devices, said at least one second user electronic device selected from the group consisting of cell phones, tablets, personal data assistants, computers, and lap tops which communicate with said centralized cloud infrastructure over the network and which defines one or more authorized users and one or more authorized locations for said one or more authorized users, wherein said at least one second user electronic device obtains and verifies from the centralized cloud infrastructure an in-attendance signal only for each authorized user located in an authorized location based on data received from the geo-locating device of each of said one or more first user electronic devices, and wherein at least one of (i) said one or more first user electronic devices and (ii) said at least one second user electronic device receives from the centralized cloud over the network the one or more of a question, answer, comment, rating, voice recording, and photo.

5. The classroom management system of claim 4, wherein the one or more first user electronic devices are configured such that said one or more authorized users selectively submit one or more questions or comments via the centralized cloud infrastructure.

6. The classroom management system of claim 5, wherein said one or more questions or comments are queued and accessible in real-time using said at least one second user electronic device.

7. The classroom management system of claim 4, wherein said one or more first user electronic devices are configured for one or more authorized users to rate other user or peer comments or questions in real-time with rating information.

8. The classroom management system of claim 7, wherein said rating information is transmitted to said centralized cloud infrastructure which aggregates and sends said rating information to said at least one second user electronic device in real-time.

9. The classroom management system of claim 4, wherein said at least one second user electronic device is configured for broadcasting messages to a plurality of selected authorized users in real time.

10. The classroom management system of claim 4, wherein said at least one second user electronic device is configured for rating submitted comments or questions from said one or more authorized users.

11. The classroom management system of claim 4, wherein said at least one second user electronic device is configured for creation and sending of tests, quizzes, and/or surveys to said one or more authorized users at said one or more first user electronic devices.

12. The classroom management system of claim 11, wherein said tests, quizzes, and/or surveys are created by an instructor in the past or in real-time using an interface of said at least one second user electronic device.

13. The classroom management system of claim 11, wherein a user interface of said one or more first user electronic devices are configured for said one or more authorized users to complete said tests, quizzes, and/or surveys and submit responses to a centralized management server of said centralized cloud infrastructure.

14. The classroom management system of claim 13, wherein said centralized management server grades one or more tests, quizzes, and/or surveys of said responses in real-time and provides an evaluation of said responses to said at least one second user electronic device.

15. The classroom management system of claim 4, wherein said one or more first user electronic devices are configured such that an authorized user of said one or more authorized users selectively sends a comprehension alert to said centralized cloud infrastructure, wherein said centralized cloud infrastructure aggregates and in real time displays a count of comprehension alerts on an interface of said at least one second user electronic device.

16. The classroom management system of claim 15, wherein said comprehension alert is sent anonymously, protecting an identity of said authorized user that initiated said comprehension alert.

* * * * *